3,242,176
VAT DYESTUFFS CONTAINING ALLYL GROUPS
Walter Jenny and Istvan Hari, Basel, Switzerland, assignors to Ciba Limited, Basel, Switzerland, a Swiss company
No Drawing. Filed May 31, 1962, Ser. No. 198,705
Claims priority, application Switzerland, June 2, 1961, 6,486/61
15 Claims. (Cl. 260—249)

The present invention provides vat dyestuffs that contain at least one allyl-mercapto or allyl-sulfone group, which group may be bound to an aliphatic chain or preferably to an aromatic nucleus of the vattable system.

The allyl-SO₂-group, that is to say, the $$CH_2=CH-CH_2-SO_2\text{-group}$$

may be bound directly to the vattable residue or through a nitrogen bridge, for example, through a bridge of the formula $$-\overset{|}{N}-C_{n-1}H_{2n-1}$$

in which $n$ is a low positive whole number, advantageously 1.

The term "vat dyestuffs" includes dyestuffs which are capable of conversion by reduction into a so-called leuco form or vat which has better affinity for natural and regenerated cellulose fibers than has the non-reduced form, and which can be reconverted by oxidation into the original chromophoric system. As suitable vat dyestuffs there may be mentioned more especially those of the anthraquinone series, for example, those which contain an unmodified 9:10-dioxoanthracene ring, and also those anthraquinones that also contain fused carbocyclic or heterocyclic rings or which consist of a plurality anthraquinone units, and also vat dyestuffs of the naphthalene or perylene tetracarboxylic acid series or of the pyrenequinone or indigoid series. In addition to at least one allyl grouping of the kind defined above the dyestuffs may also contain substituents usual in vat dyestuffs, for example, halogen atoms, alkoxy groups, acylamino groups or alkyl groups.

The invention also provides a process for the manufacture of the above new dyestuffs wherein (a) a vat dyestuff that contains a mobile halogen atom, for example, a vat dyestuff that contains a sulfonic acid halide group or a chlorotriazinyl-amino group, is condensed with an amine that contains an allylmercapto group or an allyl-SO₂-group, or (b) a vat dyestuff that contains at least one exchangeable halogen atom bound to a carbon atom or another exchangeable group, for example, an α-sulfo group, is reacted with allyl-mercaptan, or (c) a vat dyestuff containing an acylatable amino group or a corresponding intermediate product is reacted with an acylating agent, which contains an allyl-mercapto group or an allyl-SO₂-group if the starting dyestuff does not contain such an allyl group, or (d) a vat dyestuff that contains a mercapto group is etherified with an allyl halide.

As starting materials for method (a) of the process there are used vat dyestuffs that contain, for example, at least one sulfonic acid chloride group or chlorotriazinyl group or chloropyrimidyl-amino group, or a chloroalkyl-sulfone or a sulfonic acid chloroalkyl-amide group or a sulfonic acid β-sulfatoalkylamide group. Of special interest are vat dyestuffs that contain two sulfochloride groups. As examples of suitable starting materials there may be specially mentioned those of the anthraquinone series: 1:5 - dibenzoylamino-anthraquinone disulfochloride, dibenzanthrone disulfochloride, iso-dibenzanthrone disulfochloride, and the sulfochlorides of anthanthrone, dibenzpyrenequinone, pyranthrone, acedianthrone, flavanthrone, indanthrone, N:N'-diethyl-dipyrazole-anthronyl, N:N'-diisopropyl-dipyrazole-anthronyl, anthraquinone-2:1 (N)1':2'-(N)-naphthacridone, 1:1' - dianthrimide-carbazole and 2':2''-diphenyl-anthraquinone-1:2(N)-5:6 (N)-dithiazole.

Besides the sulphochlorides of the anthraquinone series already mentioned, there may be used sulphochlorides of indigoid vat dyestuffs or of perylene tetracarboxylic acid diimides or of perinone dyestuffs. The aforesaid sulfochlorides may be obtained by treating the appropriate vat dyestuffs with chlorosulfonic acid, if necessary, with partial hydrolysis of the polysulfochlorides so obtained, or by reacting the appropriate sulfonic acid with acid-halogenating agents, such as phosphorus halides, thionyl chloride or chlorosulfonic acid by known methods. Another method of obtaining the sulfochlorides to be used as starting material consists in acylating an amino-anthraquinone with benzoic acid sulfonic acid dichloride to form a chlorosulfonyl-benzoylamino-anthraquinone. In method (a) of the process there may also be used as starting materials reaction products of aminoanthraquinones with halogen-pyrimidines or halogen-triazines, such as cyanuric chloride, that contain at least one exchangeable chlorine atom, for example, a compound of the formula

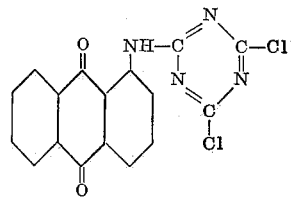

These reaction products are reacted with an amine that contains an allyl group of the kind defined above, for example, with an amine of the formula

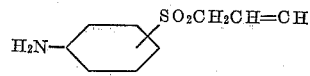

or with an amine of the formula

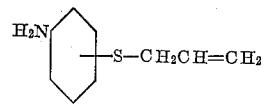

The reaction of the vat dyestuff containing mobile halogen atoms, for example, the reaction of one of the aforesaid sulfochlorides with the amine containing an allyl-mercapto or allyl-sulfone group may be carried out in an inert organic solvent, for example, nitrobenzene, chlorobenzene or ortho-dichlorobenzene, at a raised temperature. However, since the sulfochlorides are generally obtained in aqueous suspension during their preparation, it is of advantage to carry out the reaction with the amine in aqueous medium, advantageously in the presence of an agent capable of binding acid, for example, sodium acetate, sodium hydroxide or sodium carbonate. The molar ratio of the components is advantageously so chosen that at least one mol of amine is used for each chlorine atom of the vat dyestuff that is capable of reaction.

The starting materials for method (b) of the present process are advantageously anthraquinone vat dyestuffs that contain one or two exchangeable halogen atoms bound to a carbon atom of the dyestuffs molecule, for example, the mono- or di-(chloroethylsulfones) of 1:5-dibenzoyl-amino-anthraquinone or of dibenzanthrone or of iso-dibenzanthrone, and the chlorethyl-sulfones of sulfonic acid-N:β-chlorethylamides of anthanthrone, dibenzpyrenequinone, pyranthrone, acedianthrone, flavanthrone, indanthrone, N:N'-diethyl-dipyrazole-anthronyl, N:N'-diisopropyl-dipyrazole, anthronyl, anthraquinone-2:1(N): 1':2'(N)-naphthacridone, 1:1'-dianthrimide-carbazole or 2':2''-diphenylanthraquinone-1:2(N); 5:6(N)-dithiazole. Besides the aforesaid chlorethyl-sulfonamides and chlorethyl-sulfones of the anthraquinone series, there may be used vat dyestuffs containing halogen atoms or sulfo groups bound aromatically, such as the α-chloro-, α-bromo- or α-sulfo-anthraquinones containing benzoylamino groups, and also chlorotriazinyl-amino-anthraquinones which likewise yield the vat dyestuffs of the invention when reacted with allyl-mercaptan or a metal salt thereof.

As starting materials for method (c) of the process there are used amino-anthraquinones or vat dyestuffs that contain acylatable amino groups, for example, 1:5-diamino-anthraquinone, 1-amino-5-benzylamino-anthraquinone, 4 - amino-anthraquinone-2:1(N)-acridones, 4:4'-, 4:5'- or 5:5'-diamino-1:1'-dianthrimide carbazole, aminopyranthrone, mono- and diamino-acedianthrone, amino-isodibenzanthrone, amino-dibenzanthrone, amino-anthraquinone, amino-flavanthrone, amino-pyranthrone, 4- or 5-amino-1:1'-dianthrimidecarbazole, 4- or 5-amino-5'-benzoyl - amino-dianthrimide carbazole, 4-amino-4'-benzoylamino-dianthrimide-carbazole or amino-dibenzpyrenequinone, and also mono- and diamino-trianthrimide-carbazoles, for example, 8':8''-diamino-1':1:5:1''-trianthrimide-carbazole, and perylene-tetracarboxylic acid-di-(para- or meta-aminophenyl)-imide, and the compounds of the formulae

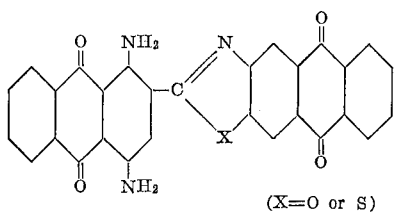

(X=O or S)

and

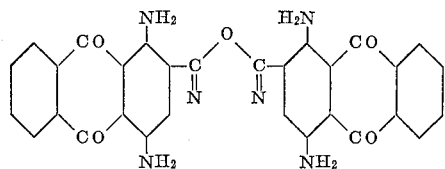

and of the formula

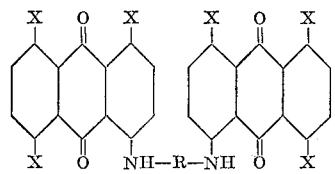

in which at least four of the symbols X represent hydrogen atoms and the others represent —NH₂ groups, and R represents a triazine residue or a —CO—R—CO— group, in which R represents an arylene residue.

As acylating agents that contain an allyl residue bound through an —S— or —SO₂— bridge, there may be mentioned more especially acid halides, advantageously those of the formulae

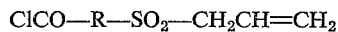

or

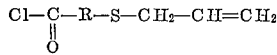

in which R represents a benzene residue or an alkylene residue. The said acylating agents are advantageously obtained by reacting the appropriate mercapto-benzoic acids with allyl halides, if required, with subsequent oxidation to allyl-sulfone benzoic acids. There may also be used as acylating agents, for example, compounds of the formula

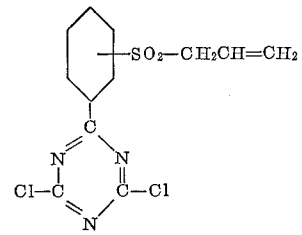

or

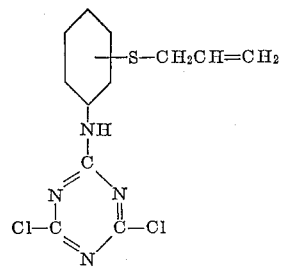

The reaction of the aminoanthraquinones or vat dyestuffs containing amino groups with the acylating agent is carried out advantageously in an inert organic solvent, for example, nitrobenzene, chlorobenzene or orthodichlorobenzene, at a raised temperature. The molar ratio of the components is advantageously so chosen that there is approximately one carboxylic acid chloride group or group of the formula

of the acylating agent for each amino group of the anthraquinone radical.

In method (d) of the process a vat dyestuff that contains an HS— group bound, for example, to an aliphatic chain or to an aromatic nucleus, is etherified with an allyl halide, especially allyl chloride or allyl bromide. This etherification is carried out in aqueous solution or in an organic solvent, such as alcohol, benzene, toluene or the like, advantageously in the presence of an agent capable of binding the hydrogen halide split off, for example, in the presence of an alkali metal hydroxide.

The vat dyestuffs of the invention, which contain a carbazole ring or an oxidazole ring, can also be made by a method in which appropriate starting materials, for example, allyl-sulfonyl- or allyl-mercapto-anthrimides, are carbazolised to allyl-sulfonyl- or allyl-mercapto-anthrimide-carbazoles with aluminum chloride by methods in themselves known, or in which the oxidazole ring is introduced into allyl-SO₂- or into allyl-mercapto-dianthraquinone-carboxylic acid hydrazides by splitting off of water, for example, by means of concentrated sulfuric acid or oleum, if desired, with simultaneous sulfonation.

Vat dyestuffs that contain allyl-mercapto groups or allyl-sulfone groups can also be obtained by subjecting ortho-carboxyarylamino-allyl-mercapto-anthraquinones or allyl-SO₂-1-arylamino-anthraquinone-2-carboxylic acids to ring closure to form acridones, or by the alkaline treatment of 1-amino-2 - bromo-allylmercapto-anthraquinones or 2-amino-1-chloroallyl-sulfonyl-anthraquinones, for example, at 160 to 190° C., in an organic solvent in the presence of an alkali carbonate to form the corresponding indanthrones.

The vat dyestuffs of the invention can be worked up into valuable dry preparations for use in dyeing or printing. They are advantageously isolated by filtration.

The filtered dyestuffs may be dried, if desired, after the addition of buffers or neutral or weakly alkaline extenders. The drying is advantageously carried out at not too high a temperature and, if required, under reduced pressure.

The new dyestuffs are suitable for dyeing or printing a very wide variety of materials, but especially for dyeing or printing textile materials of natural or regenerated cellulose by the usual vat dyeing or printing methods. The dyeings and prints produced therewith are generally distinguished by their very good properties of wet fastness, and especially by their good fastness to soda boiling. In the case of some of the dyestuffs of the invention, it is possible that they combine chemically with the fiber.

Some of the dyeings obtained with the dyestuffs of the invention are fast to dry-cleaning.

The following examples illustrate the invention, the parts and percentages being by weight unless otherwise stated, and the relationship of parts by weight to parts by volume being the same as that of the kilogram to the liter:

*Example 1*

2 parts of 1:5-diamino-anthraquinone are dissolved hot in 40 of ortho-dichlorobenzene. To the solution so obtained are added 3.56 parts of 4-allylmercapto-benzoyl chloride, and the reaction mixture is maintained at the boil for 30 minutes under reflux. The dyestuff, which precipitates on cooling, has the probable formula

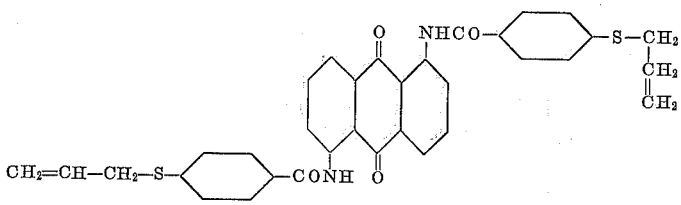

and is isolated by filtration, washed with hot alcohol and dried. It can be recrystallized from chlorobenzene and then melts at 268 to 270° C.

When applied, for example, by the dyeing prescription given below, the dyestuff dyes cotton and regenerated cellulose yellow tints possessing excellent properties of wet fastness.

A similar dyestuff, but one yielding markedly greener tints, is obtained by acylating 1-amino-5-benzoylamino-anthraquinone with 4-allylmercapto-benzoyl chloride.

4-allylmercapto-benzoic acid can be prepared in the following manner: 10 parts of 4-mercapto-benzoic acid are dissolved in 150 parts of ethyl alcohol of 75% strength, which contains 9 parts of potassium hydroxide. To the solution so obtained are added 7.5 parts of allyl chloride, and the whole is maintained at the boil for one hour under reflux. The solution is diluted with 150 parts of water and cooled to 10° C., and is rendered acid to Congo with dilute sulfuric acid. The precipitated product is isolated by filtration, washed with a little cold water, and recrystallized from ethyl alcohol. The 4-allylmercapto-benzoic acid is obtained in excellent yield in the form of white needles melting at 114° C. The corresponding acid chloride can be obtained in the usual manner by the action of thionyl chloride. It is a pale yellow oil that boils at 170° C. under a pressure of 14 mm. of Hg.

*Dyeing prescription.*—14 parts of the dyestuff obtained as described in the first paragraph of this example are finely ground in a ball mill for 24 hours with 126 parts of a neutral solution of 125 parts of dinaphthylmethane disulfonic acid in 1000 parts of water.

75 parts of the paste so obtained are suspended in 250 parts of warm water. The dyestuff suspension so obtained is introduced into a solution, having a temperature of 50° C., of 10 parts by volume of sodium hydroxide solution of 30% strength and 6 parts of sodium dithionite in 1750 parts of water, and vatted for 1 minute. 50 parts of cotton are dyed for 45 minutes at 50 to 60° C. in the dyebath so obtained in the presence of 60 parts of sodium chloride. After being dyed, the cotton is rinsed and soaped at the boil.

*Example 2*

2 parts of 1-aminoanthraquinone are dissolved hot in 60 parts of ortho-dichlorobenzene. To the solution so obtained are added 3.4 parts of 2-(4'-allylsulfonyl-phenyl)-benzthiazole-6-carboxylic acid chloride, and the reaction mixture is maintained at the boil for 30 minutes under reflux. The dyestuff, which precipitates on cooling has the probable formula

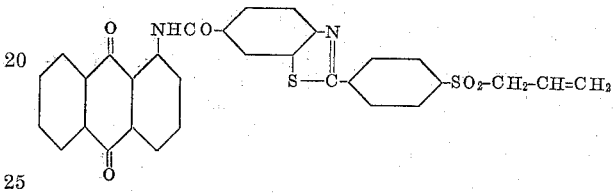

The dyestuff so obtained is isolated by filtration, washed, and recrystallized from nitrobenzene.

The dyestuff so obtained dyes cotton and regenerated cellulose pure green-yellow tints possessing excellent properties of wet fastness when applied, for example, by the dyeing prescription given in the last paragraph of Example 1.

A dyestuff that is equally fast, but yields considerably redder tints, is obtained by acylating 1-amino-5-benzoyl-amino-anthraquinone with 2-(4'-allylsulfonyl-phenyl)-benzthiazole-6-carboxylic acid chloride.

2 - (4' - allylsulfonyl-phenyl)-benzthiazole-6-carboxylic acid can be prepared in the following manner: 7.5 parts of 5-carboxy-2-amino-thiophenol hydrochloride are dissolved at 80° C. in 50 parts of pyridine. To the solution so obtained are added 8.9 parts of 4-allyl-sulfonyl-benzoyl chloride, and the whole is stirred for 1 hour at 80° C. When the reaction mixture has cooled, the precipitated crystals are isolated by suction filtration, washed with hydrochloric acid of 5% strength and water, and then dried at 65 to 70° C. The new acid crystallizes from a mixture of glacial acetic acid and dimethylformamide (1:1) in the form of white crystals, which melt at 284 to 285° C. The corresponding acid chloride can be obtained in the usual manner by reaction with thionyl chloride under reflux. It crystallizes from a mixture of benzene and nitrobenzene (5:1) in the form of white crystals which melt at 225 to 226° C.

*Example 3*

2 parts of 1:4-diamino-2-acetyl-anthraquinone are dissolved hot in 80 parts of ortho-dichlorobenzene. To the solution so obtained are added 2.72 parts of 2-(4'-allyl-sulfonyl-phenyl)-benzthiazole-6-carboxylic acid chloride, the whole is brought to the boil and maintained at the boil for 30 minutes under reflux. The dyestuff which precipitates in the form of dark blue crystals on cooling, has the probable formula

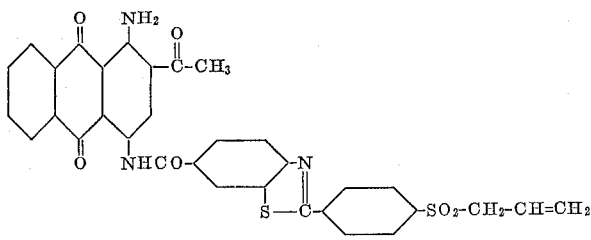

The dyestuff is isolated by suction filtration, washed with hot alcohol and dried.

The dyestuff so obtained dyes cotton and regenerated cellulose pure blue tints possessing excellent properties of fastness, when applied, for example, according to the dyeing, prescription given in the last paragraph of Example 1.

*Example 4*

To a solution of 2.72 parts of 4-allylsulfonyl-benzoyl chloride in 80 parts of dry nitrobenzene is added, at 30° C., a suspension of 3 parts of 4:4'-diamino-1:1'-dianthrimide-carbazole in 30 parts of nitrobenzene, and the whole is stirred for 6 hours at 140 to 145° C. and for 2 hours at 170 to 175° C. When the reaction mixture is cold, the dyestuff of the formula

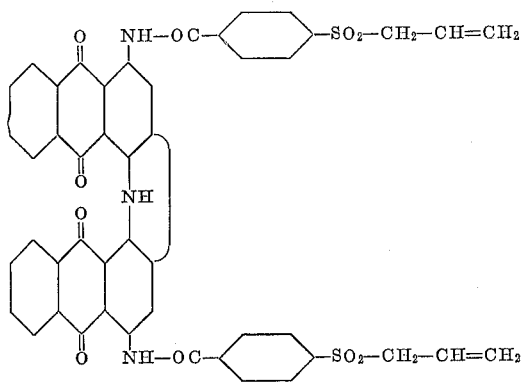

which precipitates in the form of crystals, is isolated by filtration, washed with nitrobenzene and hot alcohol, and dried in vacuo at 70° C.

When dry, the dyestuff is in the form of lustrous black crystals (plates), and dyes cotton and regenerated cellulose grey tints possessing very good general properties of fastness when applied, for example, according to the dyeing prescription given in Example 1.

4-allyl-sulfone-benzoic acid can be prepared in the following manner: A fine suspension of 4 parts of benzoic acid-4-allyl sulfide (see Example 1) is heated to 85° C. in 38 parts of water. To this suspension are added 15 parts of hydrogen peroxide of 30% strength, and the whole is stirred for 5 hours at 85° C. After cooling to 10° C., the solution so formed is stirred for a further 30 minutes, the precipitate is isolated by suction filtration, dried and recrystallized from nitrobenzene. The 4-allyl-sulfone-benzoic acid so obtained is in the form of white crystals that melt at 172 to 176° C.

The acid chloride can be prepared in the usual manner by reaction with thionyl chloride under reflux. It is in the form of white crystals that melt at 114 to 115° C.

*Example 5*

To a fine suspension of 11.0 parts of monoamino-acedianthrone in 140 parts of nitrobenzene are added, at 120° C., 6.0 parts of 4-allylmercapto-benzoyl chloride and 0.5 part by volume of pyridine. The whole is stirred for 3 hours at 160 to 170° C., and then allowed to cool. The dyestuff of the formula

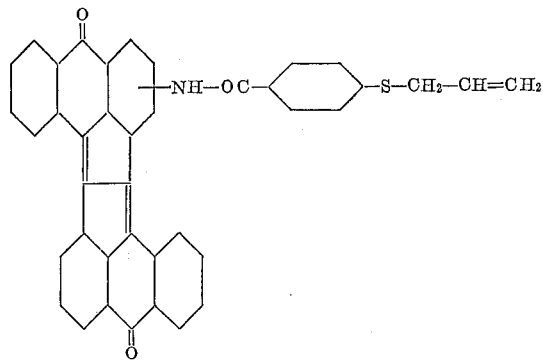

which is isolated, by filtration, is washed with hot ethanol and dried. The dyestuff so obtained is a red-brown powder that dyes cotton and regenerated cellulose attractive and very fast brown tints, when applied according to the method described in Example 1.

*Example 6*

To a fine suspension of 4.95 parts of 5:5'-diamino-1:1'-dianthrimide-carbazole in 120 parts of nitrobenzene are added, at 120° C., 4.7 parts of 3-allyl-mercapto-benzoyl chloride. The whole is stirred for 1 hour at 165° C. and allowed to cool. The dyestuff of the formula

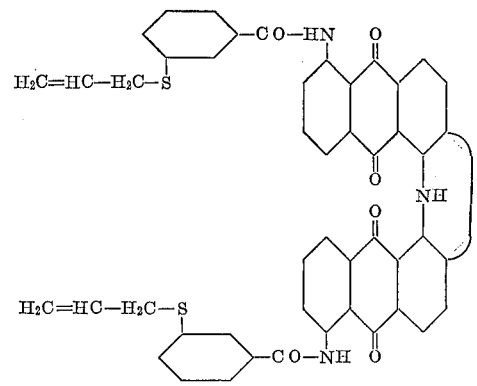

is isolated by filtration, and washed with hot ethanol and dried. The dyestuff so obtained is a light brown powder that dyes cotton and regenerated cellulose very fast light brown tints when applied according to the dyeing prescription given in Example 1. A dyestuff having similar properties is obtained by using 2-allylmercapto-benzoyl chloride is used, instead of 3-allylmercapto-benzoyl chloride.

*Example 7*

4.9 parts of 4:6-dichloro-2-[(5)-benzoylamino-anthraquinonyl - (1) - amino] - 1:3:5 - triazine are stirred into 26 parts of nitrobenzene and 5 parts by volume of N:N-diethyl-aniline at room temperature. 0.75 part of allyl mercaptan is then added, and the whole is stirred for 2 hours at 50° C., 2 hours at 100° C. and 2 hours at 140 to 145° C., and then filtered hot. The filtrate is allowed to cool, and is then diluted with a mixture of 150 parts of a mixture of ethanol and ether (2:1). The dyestuff which then precipitates has the formula

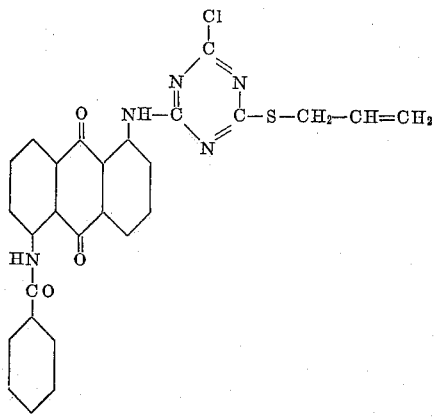

It is isolated by suction filtration, washed well with ether and dried. The dyestuff so obtained dyes cotton and regenerated cellulose pure strong yellow tints when applied according to the dyeing prescription given in Example 1.

*Example 8*

To a fine suspension of 2.5 parts of 1:4-diamino-2-anthraquinonyl-2':3'-anthraquinone-thiazole in 70 parts of nitrobenzene are added, at 120° C., 1.2 parts of 3-allyl-mercapto-benzoyl chloride and 0.1 part by volume of pyridine. The whole is stirred for 4 hours at 150° C. and for 1 hour at 180° C., and then allowed to cool. The dyestuff of the formula

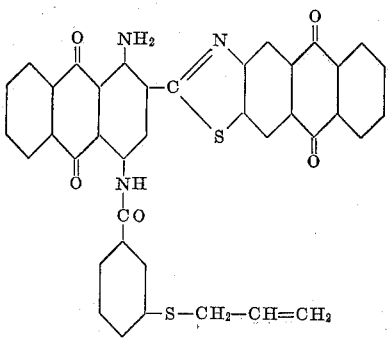

is isolated by filtration, heated to the boil in hot ethanol, isolated by suction filtration, and then dried. The dyestuff so obtained dyes cotton and regenerated cellulose strong blue tints possessing excellent properties of fastness, when applied by the dyeing prescription given in Example 1.

*Example 9*

18 parts of a moist paste of the disodium salt of 4:10-dimercapto-anthanthrone of 50% strength are dissolved in 1500 parts of water at 60° C. The solution so obtained is filtered hot, and then 8 parts of allyl chloride in 50 parts of ethanol are added, the whole is stirred for 1 hour at 80° C., and then allowed to cool. The dyestuff which precipitates has the formula

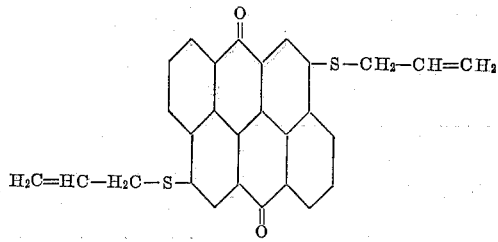

and is isolated by suction filtration, suspended in ethanol, the suspension is brought quickly to the boil, and the dyestuff is isolated by filtration and then dried.

The product so obtained is a reddish blue powder that dyes cotton and regenerated cellulose pure violet tints when applied according to the dyeing prescription given in Example 1.

The starting material can be prepared as follows:

To a fine suspension of 10 parts of 4:10-dibroman,thanthrone in 4000 parts of ethanol is added a filtered solution of 200 parts of sodium hydrosulfide of 72% strength in 800 parts of water. The whole is stirred for 24 hours at 100 to 105° C. in a porcelain autoclave, and then allowed to cool. The green crystalline precipitate is isolated by filtering with suction, and washed with a little ethanol. The product is obtained in excellent yield in the form of a dark violet mass.

*Example 10*

2.45 parts of 4:6-dichloro-2-[5-benzoylaminoanthra-quinonyl-(1)-amino]-1]3]5-triazine are stirred into 15 parts of nitrobenzene and 5 parts by volume of N:N-diethyl-aniline at 120° C. 1.0 part of 4-allyl-sulfonyl-aniline [B.R. Baker, J. Org. Chem., 15, 415 (1950)] is strewn in, the whole is stirred for 6 hours at 140 to 145° C., cooled, and then slowly diluted with 150 parts of a mixture of benzene and ether (1:1). The dyestuff which then precipitates has the formula

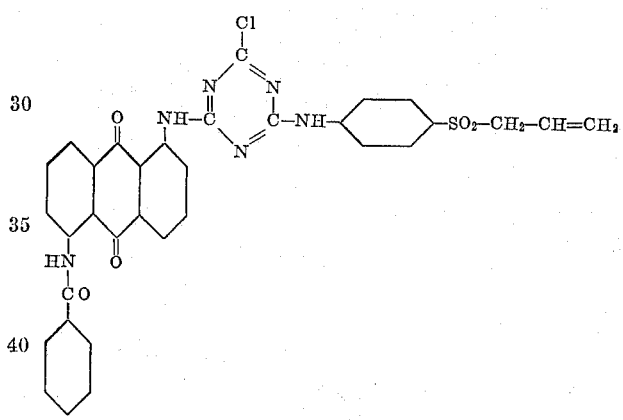

It is isolated by suction filtration, washed well with ether, and then dried. It is a khaki-coloured product containing chlorine and sulfur that dyes cotton and regenerated cellulose strong yellow tints possessing good properties of fastness, when applied according to the dyeing prescription given in Example 1.

*Example 11*

To a suspension of 1.12 parts of 2-chloro-4:6-di-(α-anthraquinonylamino)-1:3:5-triazine in 25 parts of nitrobenzene is added 1.0 part of 4.aminophenyla allyl sulfone [B. R. Baker, J. Or. Chem., 15, 415 (1950)] and the whole is stirred for 16 hours at 175° C. The solution so obtained is allowed to cool. The dyestuff of the formula

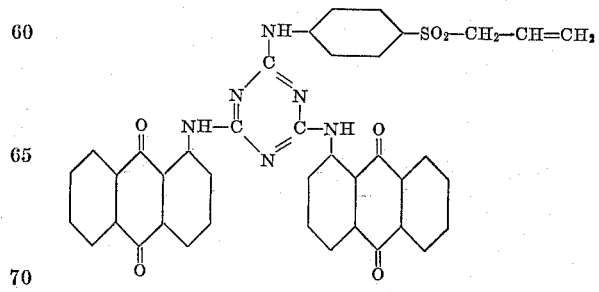

precipitates in the form of crystals, and is separated from the nitro-benzene by filtration. It is then washed with hot ethanol and dried. The dark, khaki-coloured product so obtained contains no chlorine, and dyes cotton and regenerated dellylose strong pure yellow tints possessing very good properties of fastness, when applied according to the dyeing prescription given in Example 1.

*Example 12*

A fine suspension of 1.3 parts of 2:5-bis-(1′:4′-diamino-2′-anthraquinonyl)-1:3:4-oxdiazole and 1.25 parts of 3-allyl-sulfonyl benzoyl chloride in 35 parts of nitrobenzene and 0.5 part by volume of pyridine is heated to 170 to 175° C. in a period of 1 hour. The suspension is stirred for 3 hours at that temperature and allowed to cool. The isolated dyestuff of the formula

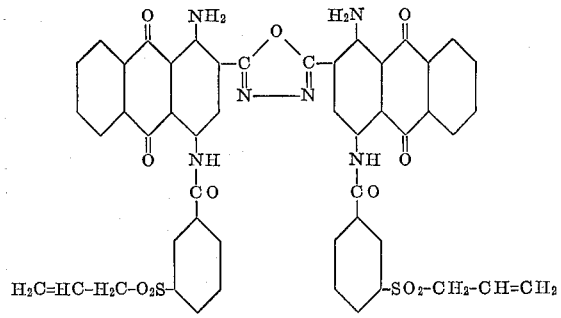

is boiled for a short time in ethanol, isolated while hot by suction filtration, and then dried. The dark blue sulfur-containing product dyes cotton and regenerated cellulose strong dark violettish blue tints possessing excellent porperties of fastness when applied, for example, according to the dyeing prescription given in the last paragraph of Example 1.

*Example 13*

A fine suspension of 2.0 parts of disulfochloride of the formula

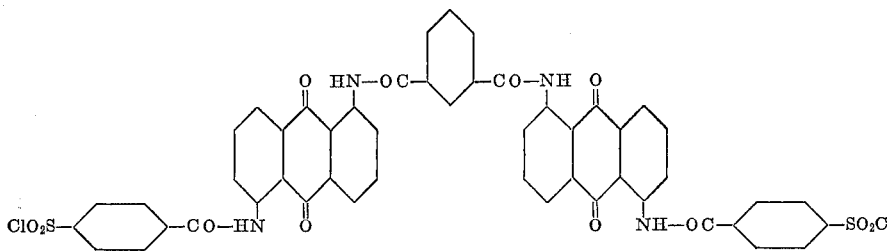

1.7 parts of 4-aminophenyl-allylsulfone and 0.2 part of anhydrous sodium carbonate in 30 of nitrobenzene, and 5 parts by volume of N:N′-diethyl-aniline is stirred for 1 hour at 165° C. The solution thus formed is cooled and then diluted with 100 parts of ethanol. The isolated dyestuff of the formula is quickly brought to the boil in ethanol of 80% strength. When cool it is separated from the alcohol and dried. The product so obtained contains no chlorine and is light brown powder that dyes cotton and regenerated cellulose strength fast pure yellow tints when applied according to the dyeing prescription given in Example 1.

*Example 14*

To a suspension of 18 parts of the aminoanthraquinone of the formula

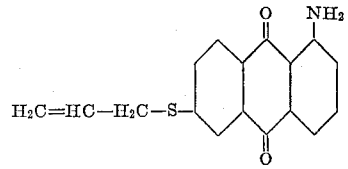

in 100 parts of nitrobenzene are added, at 120° C., 8.8 parts of benzoyl chloride, and the whole is stirred for 30 minutes at 165° C., then diluted with 200 parts of nitrobenzene, and brought quickly to the boil. The solution so obtained is filtered while hot and allowed to cool. The dyestuff of the formula

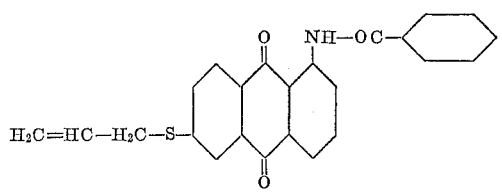

which precipitates in the form of crystals, is isolated by suction filtration, heated quickly to the boil in ethanol, is again isolated by suction filtration, and then dried. The dyestuff so obtained is an intensely yellow product that dyes cotton and regenerated cellulose fast greenish yellow tints when applied according to the dyeing prescription given in Example 1.

The aminoanthraquinone starting material can be prepared as follows:

61.5 parts of a paste of 45% strength of the sodium salt of 1-amino-6-mercapto-anthraquinone are suspended in 1000 parts of water, and heated to 60° C. To the solution so obtained are added, at 60° C., 9.2 parts of allyl chloride, and the whole is stirred for 2 hours at that temperature and then cooled. The precipitated aminoanthraquinone derivative is isolated by suction filtration, washed with water and then dried. When dry, it is in the form of a red powder.

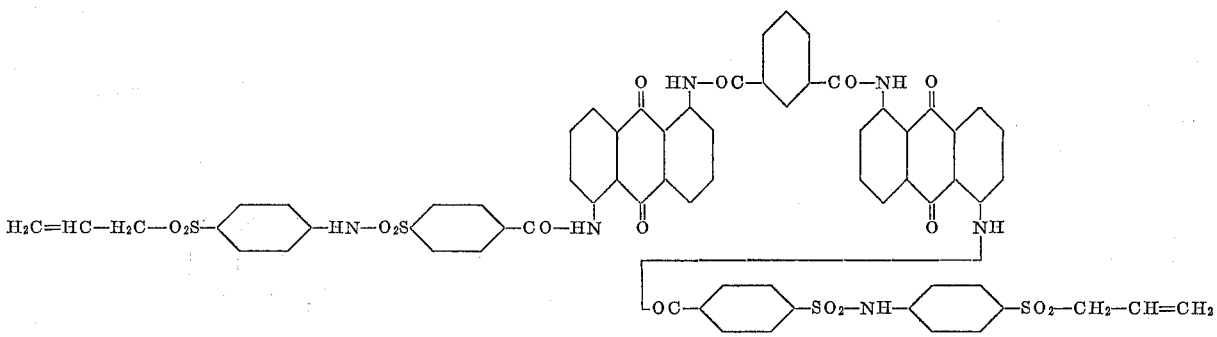

What is claimed is:

1. A vat dyestuff of the formula K—(R)$_n$ wherein R is a member selected from the group consisting of the allyl-mercapto and the allylsulfone group bound to a carbon atom of the vattable chromophore K which is selected from the group consisting of the benzoyl-aminoanthraquinone, benzoylaminoanthrimide-carbazole, benzoylaminoacedianthrone, anthraquionoylamino-1:3:5-triazine, anthanthrone, 2-anthraquinonyl-anthraquinono-thiazole, bis(aminoanthraquinonyl)-1:3:4-oxidiazole and phthaloic acid - N,N′(dibenzoylaminoanthraquinonyl)-amide chromophores, and $n$ represents a member selected from the group consisting of the whole numbers 1 and 2.

2. A vat dyestuff of the formula

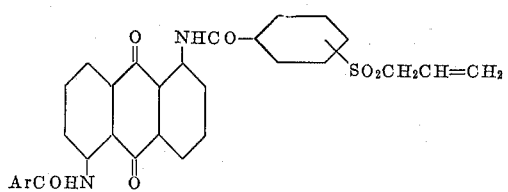

in which Ar represents a benzene radical.

3. A vat dyestuff of the formula

A—X—A wherein A represents a 1-anthraquinonylamino group bound to a carbon atom of the ring of the 1,3,5-triazine radical X whose third ring carbon atom bears an allyl-mercaptophenylamino group.

4. A vat dyestuff consisting of two anthraquinone nuclei linked to one another and bearing in each anthraquinone radical an allylmercaptobenzoylamino group.

5. A vat dyestuff consisting of two anthraquinone nuceli linked together and bearing in each anthraquinone radical an

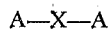

6. Allylmercaptobenzoylaminoacedianthrone.

7. Bis-(allylmercaptobenzoylamino)-dianthrimide carbazole.

8. Bis-(benzoylaminoanthraquinone)-oxdiazole bearing a CH$_2$=CH—CH$_2$—SO$_2$— substituent in the benzoyl radical.

9. The vat dyestuff of the formula

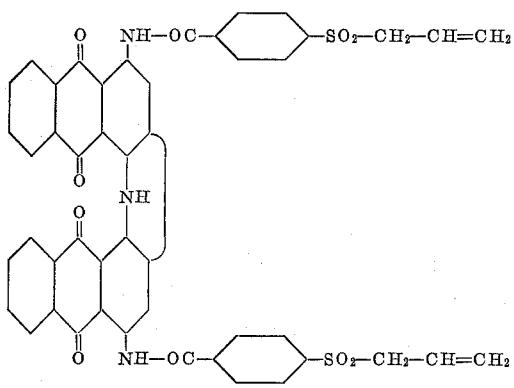

10. The vat dyestuff of the formula

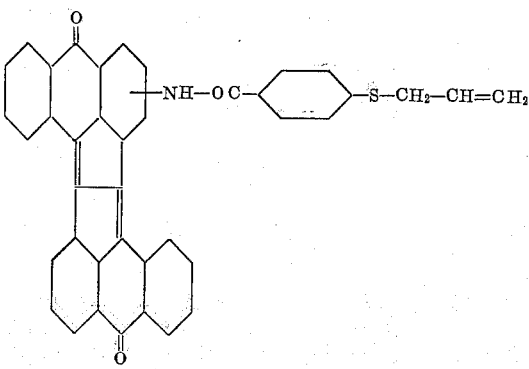

11. The vat dyestuff of the formula

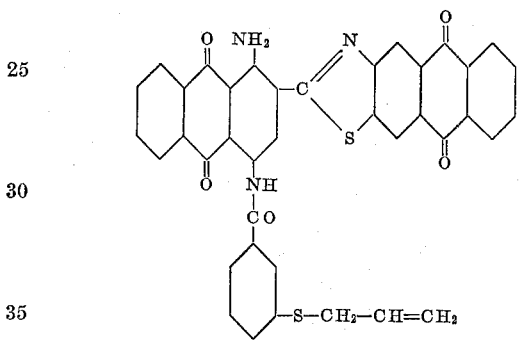

12. The vat dyestuff of the formula

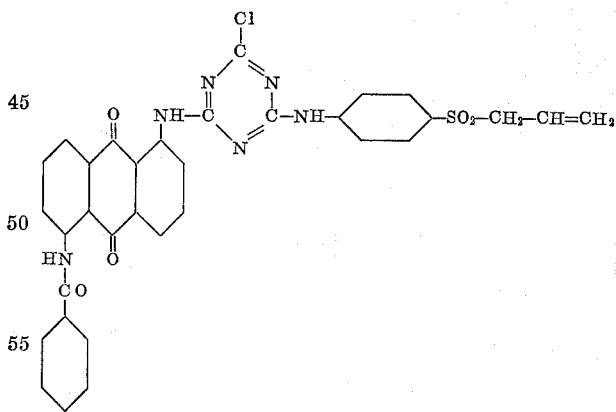

13. The vat dyestuff of the formula

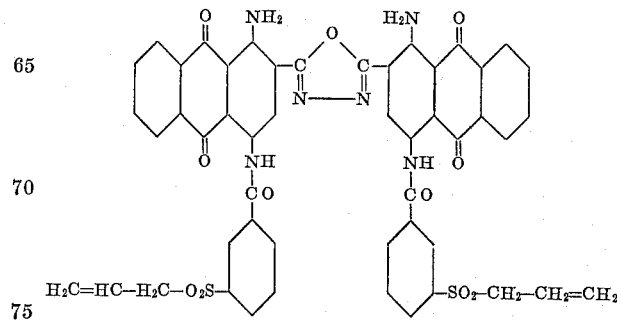

14. The vat dyestuff of the formula

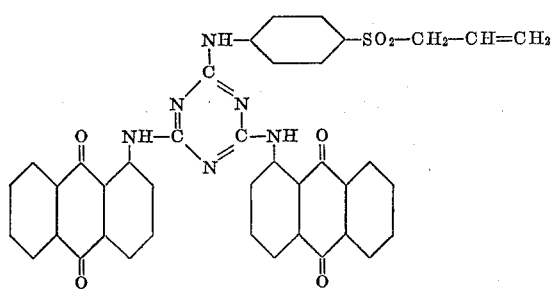

15. The vat dyestuffs of the formula A—X—A, wherein A represents a 1-anthraquinonoylamino group bound to a carbon atom of the ring of the 1,3,5-triazine radical X whose third ring-carbon atom bears an allyl-SO$_2$-phenylamino group.

References Cited by the Examiner
UNITED STATES PATENTS

| | | | |
|---|---|---|---|
| 2,657,205 | 10/1953 | Heyna et al. | 260—373 X |
| 2,658,899 | 11/1953 | Ogilvie | 260—372 X |
| 2,784,204 | 3/1957 | Heyna et al. | 260—371 X |

OTHER REFERENCES

Wegmann, "Textil Praxis," October 1958, page 1056.

WALTER A. MODANCE, *Primary Examiner.*

IRVING MARCUS, NICHOLAS S. RIZZO, *Examiners.*

MARION W. WESTERN, J. M. FORD,
*Assistant Examiners.*